United States Patent
Hofer

[15] 3,668,886
[45] June 13, 1972

[54] FREEZING APPARATUS

[72] Inventor: Hans Hofer, Lidmanskygasse 33, 9010 Klagenfurt, Austria

[22] Filed: Aug. 24, 1970

[21] Appl. No.: 66,340

[30] Foreign Application Priority Data

Aug. 29, 1969 Austria ..............................A 8308-69

[52] U.S. Cl. .................................62/346, 62/430, 62/457, 165/179
[51] Int. Cl. .........................................................F25c 7/12
[58] Field of Search..................62/354, 342, 430, 457, 529, 62/68, 59, 346; 165/90, 175

[56] References Cited

UNITED STATES PATENTS

| | | | |
|---|---|---|---|
| 944,625 | 12/1909 | Milburn | 62/346 X |
| 1,978,176 | 10/1934 | Steenstrup | 62/342 X |
| 491,104 | 2/1893 | Hart | 62/346 X |
| 2,809,498 | 10/1957 | Allen | 62/342 |
| 772,493 | 10/1904 | Balfour | 68/140 |

FOREIGN PATENTS OR APPLICATIONS 899,048  6/1962  Great Britain ...........................62/342

*Primary Examiner*—William E. Wayner
*Attorney*—Kurt Kelman

[57] ABSTRACT

A freezing drum in an apparatus for making ice cream from a liquid mass in which the drum is immersed comprises a plurality of metallic heat exchange elements distributed throughout the interior of the drum. The heat exchange elements are in heat exchange contact with the interior wall of the drum and are surrounded by a refrigerant filling the interior of the drum.

8 Claims, 3 Drawing Figures

INVENTOR
HANS HOFER

BY Kurt Kelman
AGENT

FREEZING APPARATUS

The present invention relates to a freezing apparatus, and more particularly to a quick freeze household device for making ice cream, ice milk, sherbet and like frozen confectionery products.

A conventional apparatus of this type comprises a container forming a receptacle for a liquid mass to be frozen, a rotatable freezing drum removably mounted in the container and extending into the receptacle, a refrigerant in the interior of the drum, and a scraper means having an edge facing, and in scraping contact with, the periphery of the drum above the level of the liquid mass. The freezing drum is of a material of high heat conductivity.

In apparatus of this type, the freezing drum filled with a refrigerant is kept in a deep freeze compartment of a refrigerator or freezer until the refrigerant is fully frozen. When the apparatus is to be operated, the drum is removed from deep freeze and is mounted in the container, whereupon the receptacle is filled with the liquid mass to be frozen and the drum immersed therein is slowly rotated. The ice cream layer forming on the periphery of the drum is scraped off the periphery by the scraper means and is returned by gravity to the liquid mass. As the rotation of the drum continues, the viscosity of the liquid mass increases rapidly until it reaches the consistency of ice cream.

In practice, conventional apparatus of this type has failed because it has taken too long for the liquid mass to be converted into ice cream of acceptable consistency. Also, the very cold freezing drum removed from the deep freeze had to be inserted into the container of the apparatus by hand, which was difficult and took so long that a considerable part of the cold stored in the drum was dissipated before it became effective in freezing the liquid mass in the receptacle.

It is the primary object of this invention to overcome these disadvantages and to provide an efficient freezing apparatus for making ice cream and like confectionery products within a few minutes.

It is another object of the invention to provide an apparatus of this type which may be assembled and disassembled readily and rapidly, and which may be operated simply.

It is also an object of the present invention to provide an apparatus for making several different flavors of frozen products simultaneously.

The above and other objects are accomplished in a freezing apparatus of the indicated type by providing a plurality of metallic heat exchange elements distributed throughout the interior of the freezing drum. The heat exchange elements are in heat exchange contact with the interior wall of the drum and are surrounded by the refrigerant. The heat exchange elements transmit the stored cold in the frozen refrigerant very rapidly to the liquid mass in contact with the periphery of the drum.

High efficiency is obtained when the ratio of the cubic volume (in cubic millimeters) of the refrigerant to the square area (in square millimeters) of the surfaces of the exchange elements in contact with the refrigerant is between 2.5 : 1 and 3.5 : 1.

A eutectic sol, for instance a potassium chloride solution whose freezing point is at $-11.1°$ C., is a useful refrigerant.

Copper, aluminum or aluminum alloys are useful metals for the freezing drum and/or the heat exchange elements.

When the refrigerant solution is poured into the drum, sufficient expansion space must be left in the interior of the drum to permit the refrigerant to expand during freezing without distorting or deforming the drum wall.

The efficiency of the apparatus is increased if the receptacle bottom is of such arcuate shape that the drum is eccentric in respect of the receptacle whereby the interspace between the drum periphery and the container bottom gradually narrows in the direction of drum rotation.

According to a preferred feature of this invention, there is provided a support structure for the drum, the drum having two axially extending trunnions, and the support structure including a support rod extending parallel to the axis of the drum and two support arms interconnected by the support rod and supporting the trunnions of the drum. In this way, the drum may be readily mounted in, and removed from, the container of the apparatus without being touched. The support structure may be fixedly connected to the freezing drum and may be kept in deep freeze with the drum.

The above and other objects, advantages and features of the present invention will become more apparent in the following detailed description of now preferred embodiments thereof, taken in conjunction with the accompanying drawing wherein FIG. 1 is a longitudinal section of a freezing apparatus according to this invention;

Figure 1:
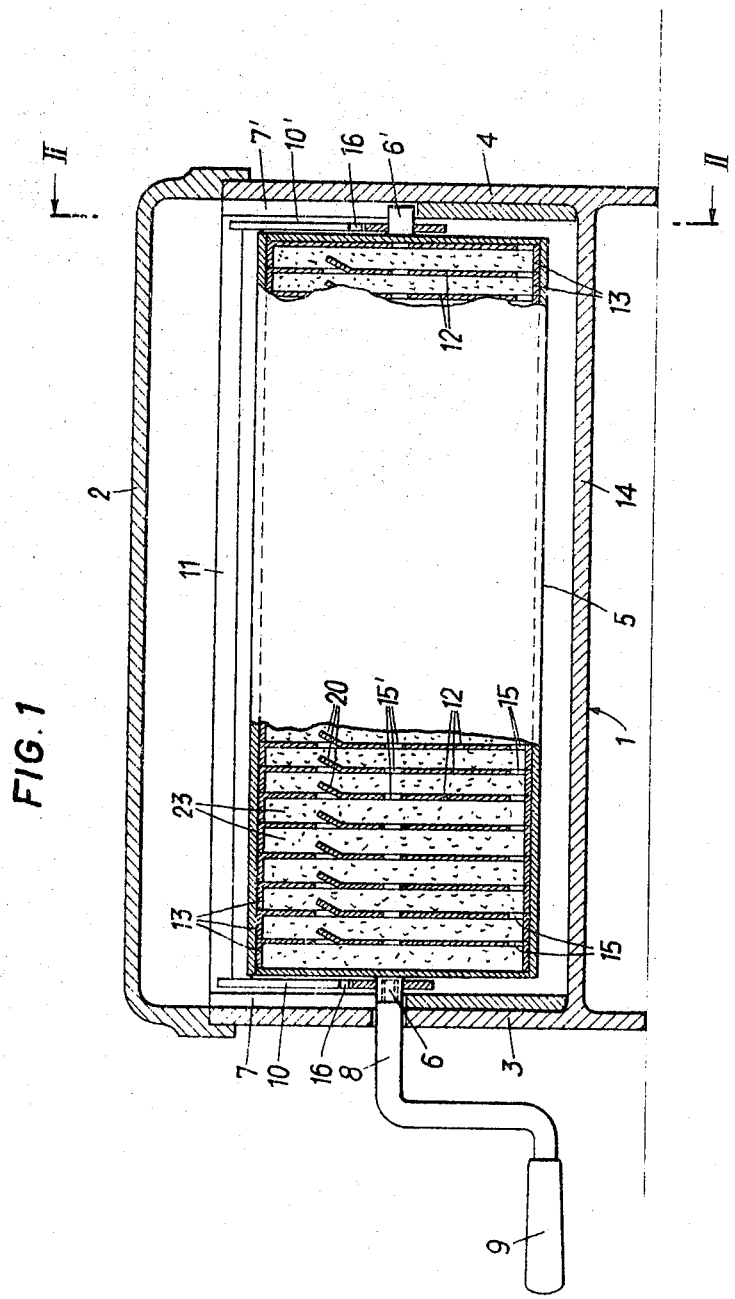
Figure 2:
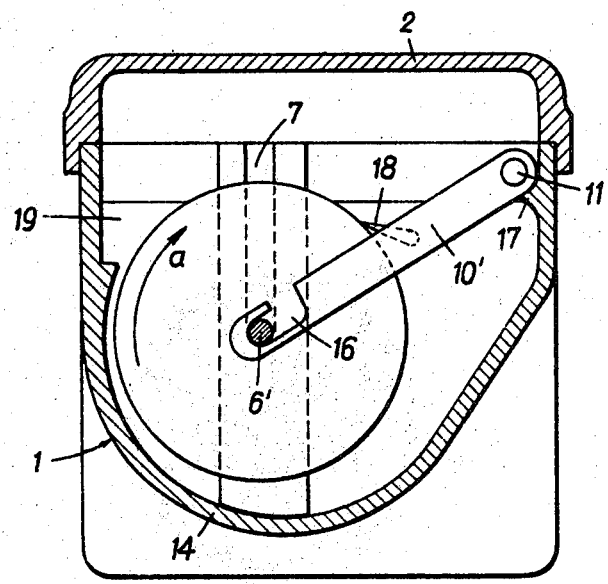
FIG. 2 is a transverse section along line II—II of FIG. 1.

Referring now to the drawing and first to FIGS. 1 and 2, the freezing apparatus is shown to include a container 1 having a trough-shaped bottom 14 and an open top which may be closed by cover 2. The container and cover are preferably made of a suitable rigid synthetic resin, such as Plexiglas. The container has two transversely extending end walls 3, 4 supporting rotatable freezing drum 5. To support the drum removably on the end walls, these walls define respective longitudinal slots 7, 7' which slidably receive trunnions 6, 6' extending from the respective ends of the drum 5 into the slots 7, 7'. A crank handle 9 has an arm 8 which threadedly engages trunnion 6 and extends through a journal in end wall 3. Upon actuation of crank 9, the drum 5 is rotated. When desired, the crank may be unscrewed to disengage it from trunnion 6 to enable the drum to be removed from container 1.

The freezing drum 5 is made of a material of good heat conductivity, for instance a metal such as copper or aluminum. It is useful to coat the surface of the drum with a thin chromium layer which is preferably roughened to increase the adherence of a liquid mass being frozen to the drum.

According to the invention, a plurality of heat exchange elements are mounted inside the drum and in heat exchange contact with the drum wall. The illustrated heat exchange elements are a series of parallel and equidistant metal discs 12 provided with annular rims or flanges 13 in heat exchange contact with the interior of the drum wall 15. The chambers between the metal discs are filled with a refrigerant 23, such as a eutectic sol of potassium chloride, these chambers being in communication with each other through apertures 15, 15' in the discs. The discs also have stamped-out baffle strips 20 defining additional apertures 21 in the discs 12 and improving the flow of the refrigerant in the interior of the drum 5.

The trough-shaped bottom 14 of the container 1 forms a receptacle for a liquid to be frozen and this receptacle is divided by transverse separating wall 19.

The drum is removably held in the container by means of a support structure including a pair of support arms 10, 10' which are interconnected by axially extending support rod 11. The ends of the support arms opposite to the ends attached to the support rod define undercut slots 16 receiving the trunnions 6, 6' of drum 5. A scraper or doctor blade 18 is mounted between the arms 10, 10' for scraping engagement with the periphery of drum 5. Thus, when the drum is rotated clockwise in the direction of arrow $a$ (FIG. 2), the support arms 10, 10' of the drum are pressed against an inwardly projecting, axial rib 17 of container 1 while the scraper 18 is simultaneously pressed against the periphery of the drum at an oblique angle in relation thereto.

Figure 3:
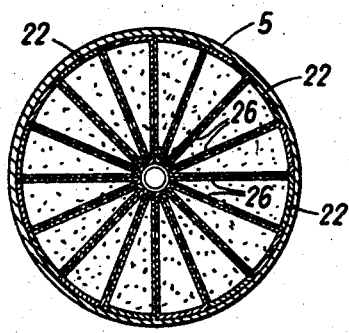
FIG. 3 is a transverse section of a freezing drum with modified heat exchange elements.

The modified heat exchange elements 22 shown in FIG. 3 consist of sheet metal bodies of sector-shaped cross section defining chambers holding the refrigerant. Each sheet metal body 22 has two radially extending side walls and an arcuate end wall, the side walls of adjacent sheet metal bodies being in heat exchange contact and the arcuate end walls of these bodies being in heat exchange contact with the interior wall of drum 5. The refrigerant chambers of the sheet metal bodies 22 are in communication by apertures 26 in the radially extending side walls.

This modification of the freezing drum is particularly suited for mass production since the entire series of sheet metal bodies 22 may be moved into the interior of the drum in a single assembly step.

The freezing apparatus hereinabove described operates as follows:

The drum 5 filled with refrigerant and mounted on support structure 11, 10, 10' is removed from a deep freeze compartment of a refrigerator or freezer and is placed into container 1 with the trunnions 6, 6' of the drum engaging the slots 7, 7' of the container end walls 3, 4. The crank 9 is then connected to the drum by moving crank arm 8 through the journal in end wall 3 and threadedly connecting it to trunnion 6. The crank is now rotated to move the drum in the direction of arrow $a$ so that the support structure is pressed against rib 17 and the scraper 18, which is fixedly attached to the support arms 10, 10' is pressed at an oblique angle against the periphery of drum 5.

The apparatus is now in operating condition and the container 1 is filled with a liquid mass to be frozen, this mass filling the receptacle formed in the bottom 14 of the container at both sides of dividing wall 19 to a level below the scraper 18. If ice cream is to be made in the apparatus, the liquid mass will be a suitable mixture for making ice cream. The temperature of the freezing drum 5 is such that the liquid mass layer in direct contact with the periphery thereof freezes instantly and adheres to the periphery.

The drum is now rotated by crank 9 so that the frozen layer adhering to the periphery of the drum is scraped off by scraper 18 and is returned by gravity to the liquid mass at the bottom of the container. As shown in FIG. 2, the freezing drum 5 is eccentrically mounted in the container 1 so that the transverse cross section of the interspace defined between the drum periphery and the container bottom gradually narrows in the direction of the drum rotation, which produces a maximum use of the cold emitted by the drum periphery and favorably influences the process of ice cream production.

In this manner, the liquid mass is transformed into a relatively hard frozen mass, for instance of ice cream, within a very short time. If it is desired to produce a number of different flavors of ice cream, a corresponding number of dividing walls 19 may be placed in the container to separate the different liquid masses from each other and thus to enable the apparatus to produce all flavors simultaneously.

In one specific embodiment, for instance, a drum having a diameter of 58 mm and a length of 190 mm was used. The drum contained 45 copper discs having a gage of 0.8 mm and was filled with potassium chloride solution having a freezing point of $-11.1°$ C. Half a liter of a commercially available liquid mass for making ice cream was converted into ice cream of high quality within four minutes in this apparatus having the structure illustrated in FIGS. 1 and 2. Equally good results were obtained with drums and heat exchange elements of an aluminum-magnesium alloy which is chemically inert to the refrigerant.

What is claimed is:

1. In a freezing apparatus: a container forming a receptacle for a liquid mass to be frozen, a rotatable freezing drum removably mounted in said container and extending into said receptacle, the drum being of a material of high heat conductivity, a eutectic sol refrigerant in the interior of the drum, a scraper means in scraping contact with the periphery of the drum above the level of the liquid mass, and a plurality of metallic heat exchange elements distributed throughout the interior of the drum, the heat exchange elements being in heat exchange contact with the interior wall of the drum and being surrounded by the refrigerant, the ratio of the cubic volume of the refrigerant to the square area of the surfaces of the heat exchange elements in contact with the refrigerant being between $2.5 : 1$ and $3.5 : 1$.

2. In the freezing apparatus of claim 1, wherein the heat exchange elements are metal discs equidistantly mounted in the interior of the drum perpendicularly to the axis thereof, the metal discs having flanges engaging the interior wall of the drum.

3. In the freezing apparatus of claim 2, the metal discs defining apertures whereby the chambers between the metal discs are in communication with each other.

4. In the freezing apparatus of claim 2, wherein baffle strips project from the metal discs.

5. In the freezing apparatus of claim 1, wherein the heat exchange elements are sheet metal bodies of sector-shaped transverse cross section, each body consisting of two radially extending side walls and an arcuate end wall, the radially extending side walls of adjacent ones of the sheet metal bodies being in heat exchange contact and the arcuate walls of said bodies being in heat exchange contact with the interior wall of the drum.

6. In the freezing apparatus of claim 1, the freezing drum being eccentrically mounted in the container whereby the transverse cross section of the interspace defined between the drum periphery and the container bottom gradually narrows in the direction of the drum rotation.

7. In the freezing apparatus of claim 1, further comprising a support structure for the drum, the drum having two axially extending trunnions, and the support structure including a support rod extending parallel to the axis of the drum and two support arms interconnected by the support rod and supporting the trunnions of the drum.

8. In the freezing apparatus of claim 7, wherein the scraper means is mounted on and between the support arms.

* * * * *